US012559990B2

(12) United States Patent
Barron

(10) Patent No.: US 12,559,990 B2
(45) Date of Patent: Feb. 24, 2026

(54) ELONGATE BODY WITH EXOSKELETON

(71) Applicant: Zeal Innovation Ltd, Swansea (GB)

(72) Inventor: Neil Anthony Barron, Swansea (GB)

(73) Assignee: Zeal Innovation Ltd, Swansea (GB)

( * ) Notice: Subject to any disclaimer, the term of this patent is extended or adjusted under 35 U.S.C. 154(b) by 98 days.

(21) Appl. No.: 18/550,719

(22) PCT Filed: Mar. 15, 2022

(86) PCT No.: PCT/GB2022/050665

§ 371 (c)(1), (2) Date: Sep. 15, 2023

(87) PCT Pub. No.: WO2022/195275

PCT Pub. Date: Sep. 22, 2022

(65) Prior Publication Data

US 2024/0159085 A1 May 16, 2024

(30) Foreign Application Priority Data

Mar. 15, 2021 (GB) ..................................... 2103571

(51) Int. Cl.
*E05B 71/00* (2006.01)
*D07B 1/06* (2006.01)
*D07B 1/16* (2006.01)

(52) U.S. Cl.
CPC ............ *E05B 71/00* (2013.01); *D07B 1/0673* (2013.01); *D07B 1/162* (2013.01);
(Continued)

(58) Field of Classification Search
CPC ........ E05B 71/00; E05B 67/003; E05B 67/04; E05B 67/06; E05B 73/00; E05B 73/0005;
(Continued)

(56) References Cited

U.S. PATENT DOCUMENTS 1,069,646 A * 8/1913 Richter ................. E05B 67/003 70/49
1,384,561 A * 7/1921 Hampton .............. E05B 67/003 70/53
(Continued)

FOREIGN PATENT DOCUMENTS

CN 2183419 Y * 11/1994 ............. E05B 65/00
CN 105569462 A * 5/2016 ............. E05B 67/06
(Continued)

OTHER PUBLICATIONS

International Preliminary Report on Patentability for corresponding Application No. PCT/GB2022/050665, issued Sep. 12, 2023,8 pages.

(Continued)

*Primary Examiner* — Steven A Tullia
(74) *Attorney, Agent, or Firm* — Dority & Manning, P.A.

(57) ABSTRACT

An elongate body adapted to bend in a single plane, comprises a rope extending within a succession of individual tubular elements closely spaced along the rope. Each element has on two opposite sides of the plane an extended section engaging a recess in its neighbouring element, the profiles of the section and recess allowing relative rotation of adjacent elements in said plane. The tubular elements thus form an exoskeleton around the rope which must be breached before the rope can be cut. The geometry of the tubular elements can be such that notwithstanding gaps, the rope cannot be readily accessed unless the exoskeleton is broken.

23 Claims, 2 Drawing Sheets

(52) U.S. Cl.
CPC .................. *D07B 2201/104* (2013.01); *D07B 2201/2041* (2013.01); *D07B 2201/2066* (2013.01); *D07B 2201/2082* (2013.01); *D07B 2201/2084* (2013.01); *D07B 2201/2092* (2013.01)

(58) Field of Classification Search
CPC D07B 1/0673; D07B 1/162; D07B 2201/104; D07B 2201/2041; D07B 2201/2066; D07B 2201/2082; D07B 2201/2084; D07B 2201/2092; D07B 2201/2083; D07B 5/00; D07B 5/005; A45C 13/20
USPC ........................................................... 70/233
See application file for complete search history.

(56) References Cited

U.S. PATENT DOCUMENTS 1,394,259 A * 10/1921 Johnson ................ E05B 67/003 70/49
1,485,394 A * 3/1924 Haynes ................... F16L 11/10 138/120
2,177,128 A * 10/1939 Johnson .................. F16G 13/16 138/110
3,282,044 A * 11/1966 Maisey ................... F16L 3/015 376/268
3,557,780 A * 1/1971 Sato ..................... A61B 1/0055 600/141
3,696,647 A * 10/1972 Balicki ................. E05B 67/003 70/49
3,799,151 A * 3/1974 Fukaumi .............. A61B 1/0055 600/149
3,844,019 A * 10/1974 Shwayder ............... E05B 67/06 428/685
3,933,015 A * 1/1976 Balicki ................. E05B 67/003 70/49
3,955,599 A * 5/1976 Walker ..................... B21D 7/10 72/369
4,108,211 A * 8/1978 Tanaka ................. A61B 1/0055 138/120
4,177,541 A * 12/1979 Seakan ............... E05B 73/0005 24/122.3
4,396,797 A * 8/1983 Sakuragi .............. G02B 6/4461 138/120
4,487,010 A * 12/1984 Chiappetta ............. D07B 1/068 57/221
4,561,272 A * 12/1985 Goldstein ............... E05B 67/06 70/417
4,686,963 A * 8/1987 Cohen .................. A61B 1/0055 138/120
4,703,135 A * 10/1987 Magnani .............. H01R 13/562 138/120
5,069,486 A * 12/1991 Kimura ................ G02B 6/4461 138/120
5,271,382 A * 12/1993 Chikama .............. A61B 1/0055 138/120
5,406,810 A * 4/1995 Chen ..................... E05B 67/003 70/53
5,448,989 A * 9/1995 Heckele ............... A61B 1/0052 600/149
5,475,993 A * 12/1995 Kuo ........................ E05B 71/00 70/53
5,706,679 A 1/1998 Zane et al.
6,408,889 B1 * 6/2002 Komachi ............. A61B 1/0055 138/155
6,510,717 B1 1/2003 Levi
RE38,136 E 6/2003 Kolmes
6,648,376 B2 * 11/2003 Christianson ............. E03C 1/06 138/120
6,682,493 B2 * 1/2004 Mirigian ............... A61M 25/09 600/585
6,941,974 B2 * 9/2005 Utaki ................... H02G 11/006 138/155
7,055,656 B2 * 6/2006 Drew ........................ F16C 1/26 188/65.1
8,246,575 B2 * 8/2012 Viola .................. A61B 1/0051 604/95.04
8,302,436 B2 * 11/2012 Cheung ................. E05B 67/003 70/30
8,429,940 B2 * 4/2013 Evans .................. E05B 67/003 70/52
8,448,669 B2 * 5/2013 Wen .......................... F16C 1/26 138/119
8,497,427 B2 * 7/2013 Wen ........................ F16C 1/267 74/502.5
8,758,232 B2 * 6/2014 Graham ................. A61B 34/71 600/145
8,869,840 B2 * 10/2014 Lund ..................... E21B 17/017 138/120
8,904,831 B2 * 12/2014 Stevens ................. E05B 67/003 70/53
8,989,528 B2 * 3/2015 Udd ....................... A61B 5/065 385/13
9,243,428 B1 * 1/2016 Miracle ............... E05B 73/0005
9,334,678 B2 * 5/2016 Allen .................. E05B 73/0005
9,377,133 B2 * 6/2016 Pionetti ................... F16L 57/02
9,506,274 B1 * 11/2016 Miracle ................. E05B 67/003
10,196,837 B2 * 2/2019 Holmes ............... E05B 15/1614
10,563,431 B2 * 2/2020 Holmes ............... E05B 73/0005
10,946,914 B2 * 3/2021 Schachter .............. B62H 5/003
11,613,003 B2 * 3/2023 Graham ................... B25J 18/02 600/141
11,692,650 B2 * 7/2023 Graham .................. F16L 3/015 138/120
11,752,622 B2 * 9/2023 Graham ................... B25J 9/106 134/72
11,866,960 B2 * 1/2024 Delhom Munoz .... B62H 5/003
12,194,620 B2 * 1/2025 Graham ................... B25J 18/02
2006/0179966 A1 * 8/2006 Kuo .......................... F16C 1/26 74/502.5
2008/0276664 A1 * 11/2008 Shu ........................ B62H 5/003 70/18
2010/0326231 A1 * 12/2010 Kuo .......................... F16C 1/26 74/502.5
2011/0038064 A1 * 2/2011 Xhunga .................. F21V 21/28 362/418
2013/0068341 A1 3/2013 Wen
2015/0164171 A1 6/2015 Margetis et al.
2017/0370046 A1 12/2017 Rommel
2019/0186090 A1 6/2019 Tunis, III et al.
2020/0318391 A1 * 10/2020 Selander ................. E05B 37/02

FOREIGN PATENT DOCUMENTS

DE 4302757 C1 * 3/1994 ............. F16G 13/16
DE 202008016698 U1 * 6/2010 ............. E05B 39/00
DE 202015104232 U1 * 9/2015 ............. B62H 5/003
EP 0725003 A1 * 8/1996 ........... E05B 67/003
EP 764423 A1 * 3/1997 ........... A61B 1/0055
EP 0774404 A1 * 5/1997 ........... E05B 73/000
EP 995965 A2 * 4/2000 ............... F41H 7/04
EP 2573411 A1 * 3/2013 ............ B60T 11/046
ES 2733977 A1 * 12/2019 ............... B62H 5/00
FR 2645495 A1 * 10/1990 ........... E05B 67/003
FR 3057240 A1 * 4/2018 ............... B62H 5/00
GB 1392268 A * 4/1975 ............... E05B 7/06
GB 2167777 A * 6/1986 ........... D07B 1/0673
GB 2435084 A * 8/2007 ........... H02G 3/0475
GB 2440600 A * 2/2008 ........... E05B 45/005
GB 2618852 A * 11/2023 ............. A45C 13/20
IT 201700093262 A1 * 2/2019 ............. E05B 71/00
JP 2001317257 A * 11/2001 ............. E05B 71/00
JP 2005067412 A 3/2005
JP 2011043010 A * 3/2011 ............. E05B 71/00
KR 20120063175 A * 6/2012 ............. E05B 45/08
WO WO 2004/041629 5/2004
WO WO-2007020156 A1 * 2/2007 ........... D07B 1/0613
WO WO2010103327 A2 9/2010
WO WO-2011091474 A1 * 8/2011 ......... E05B 17/0004
WO WO-2013186505 A1 * 12/2013 ............. E05B 63/00

(56) References Cited

FOREIGN PATENT DOCUMENTS

| | | | | | |
|---|---|---|---|---|---|
| WO | WO2015087067 | A1 | | 6/2015 | |
| WO | WO-2018169422 | A1 | * | 9/2018 | ............... B62H 5/00 |
| WO | WO-2022112019 | A1 | * | 6/2022 | ........... E05B 67/003 |
| WO | WO-2022234147 | A1 | * | 11/2022 | ........... E05B 45/005 |

OTHER PUBLICATIONS

PCT International Search Report and Written Opinion for corresponding PCT Application No. PCT/GB2022/050665, mailed Jun. 13, 2022, 9 pages.
UK Search Report for corresponding GB Application No. GB2103571.2, dated Nov. 15, 2021, 3 pages.
Korean Office Action (w/ English translation) for corresponding Application No. 10-2023-7034998, dated Nov. 2, 2024, 23 pages.

* cited by examiner

ELONGATE BODY WITH EXOSKELETON

This application is a U.S. national phase application of International Patent Application No. PCT/GB2022/050665, filed on Mar. 15, 2022, which, in turn, is based upon and claims the right of priority to UK Patent Application No. 2103571.2, filed on Mar. 15, 2021, the disclosures of both of which are hereby incorporated by reference herein in their entireties by reference for all purposes.

This invention relates to security devices, and has particular application in security devices in which two ends of an elongate body must be held together. Such devices can be used for securing baggage and light vehicles in the manner described in various Patent publications including International Specification Nos. WO2010/103327 and WO2015/087067; and U.S. Pat. Nos. 5,706,679 and 6,510,717, the disclosures whereof are hereby incorporated by reference. The present invention is directed at such an elongate body in the form of a flexible body, which can also be used as part of a flexible plate or planar item. The object of the invention is provide a body that offers increased resistance to attempts to cut it. Reference is also directed to US Patent Publication No. 2013/0068341A1 which discloses a cable sheath comprising connected plural tubes.

According to the present invention an elongate body adapted to bend in a single plane, comprises a rope extending within a succession of individual tubular elements closely spaced along the rope. Each element has on two opposite sides of the plane an extended section engaging a recess in its neighbouring element, the profiles of the section and recess allowing relative rotation of adjacent elements in said plane. The elements are independent of each other and there is no radial engagement or overlap between adjacent elements. The tubular elements thus form an exoskeleton around the rope which must be breached before the rope can be cut. The geometry of the tubular elements can be such that notwithstanding gaps, the rope cannot be readily accessed unless the exoskeleton is broken.

The rope which defines the axis of the elongate body of the invention is normally a wire rope, preferably a compacted wire rope. Such a rope may comprise metallic strands wound round an helically wound metallic core. In some embodiments, the rope can be replaced by a chain. However, the rope may serve a particular purpose such as an electronic conductor or carrier for fluids; gas or liquid. The term "rope" should be understood to have this broad meaning in the context of this Application.

Preferred embodiments of the invention have restricted bending in one direction in their bending plane. This can be accomplished by using tubular elements that have on a third side substantially perpendicular to the plane juxtaposed sections that engage when the body is sought to be bent in that one direction. In this arrangement the respective element sections can be designed to engage when the body is substantially straight.

Each tubular element will normally comprise a cut-resistant material. Examples of suitable materials are cermet; tungsten carbide; titanium carbide; titanium nitride, and titanium carbon nitride. The cut-resistant material will not usually form the entirety of each element, but can be part of it or coated on the element. This can be accomplished by flame spraying or laser cladding.

Each tubular element in an elongate body according to the invention can be a solid, preferably metallic tube; cast, moulded or fabricated, but is preferably a skeletal structure or a perforated tube. For example, a fabricated element might comprise a single metal pressing cut to shape and closed into a tube with the closing edges secured by one of crimping clinching and welding. Another might comprise two matching metal pressings cut to shape and closed into a tube with the closing edges secured by one of crimping clinching and welding. Such fabricated elements can be formed with ridges creating a channel for reinforcing strips. However, in all embodiments of the invention some form of reinforcing strip may be provided, preferably on at least one side of said plane and aligned with the engaging extended sections and recesses.

In order to accommodate bending the rope in a body according to the invention must be allowed to move relative to the surrounding tubular elements. Typically, each end of the exoskeleton will be received in a shell attached to the rope, allowing axial movement of the respective tubular elements within the shells corresponding to that required as the body is bent. The rope may extend beyond one shell or both shells depending upon the application of the body. Alternatively, each shell may be fixedly attached to a rope end to define the length of the body. Such shells may be locking units, for attachment to each other or to separate parts of a closure. Elongate bodies according to the invention thus have particular use in security devices. A simple such device will be a body of the invention including complementary locking units at respective ends thereof. A typical use will be as a bicycle or motorcycle lock.

Relative movement of the rope and tubular elements can also be accommodated by the spacing or degree of engagement of the elements with the elements at each end of the body being fixed to the rope. Close engagement of the elements will result in the body being stiff with relatively limited bending. The looser the engagement between the elements the more bending will be possible. When designed to close as a loop as in a cycle lock for example, it is recommended that the engagement is such that the body can be bent to close and lock the ends together with the body substantially rigid.

Another use for bodies of the invention is in the formation of a flexible plate. A plurality of bodies may be laid side to side in a plane common with the bending plane with the tubular elements in each body linked to those in the neighbouring body.

The invention will now be described by way of example and with reference to the accompanying schematic drawings wherein.

Figure 1:
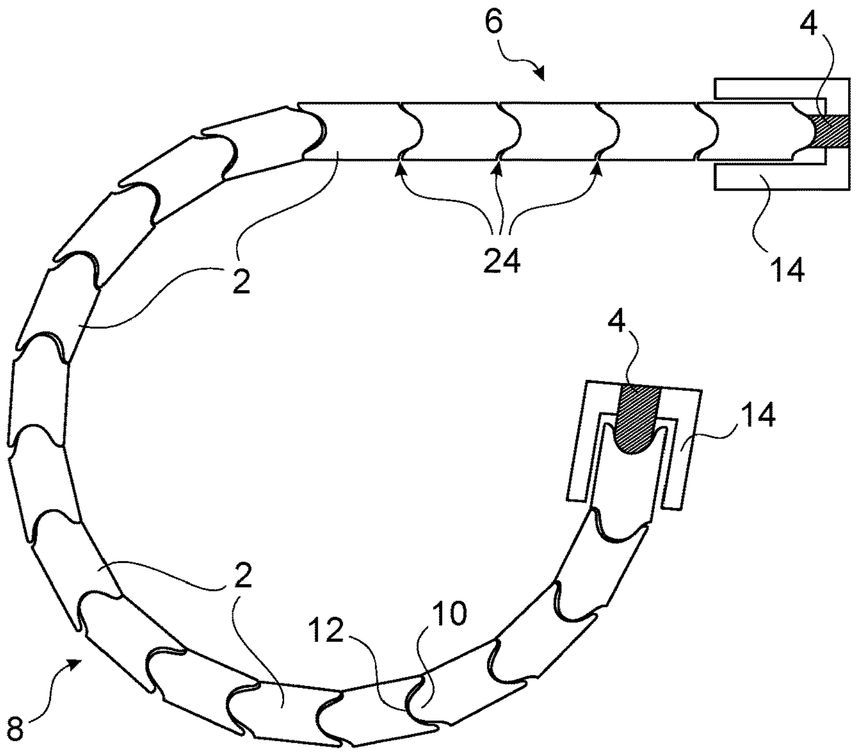
FIG. 1 shows an elongate body according to the invention, part broken to illustrate the end units.

The elongate body shown in FIG. 1 has a plurality of tubular bodies 2 inter-engaging along a length 4 of rope. The body is arranged with a straight section and a section 8 curved in a single plane. Each element has an extension 10 which is received in a recess 12 in its neighbour. The elements 2 are not connected, but in close engagement, and the matched arcuate edges of the extension 10 and recess 12 allow rotation of each element relative to its neighbour. Their close engagement means that when the body is bent in a direction that increases that engagement the extension and recess make contact and prevent or restrict such bending. The elements 2 are formed with similarly arranged extensions and recesses on the opposite side of the rope 4. In this way, bending of the body is restricted to substantially a single plane. An arrangement of extensions and recesses are also formed on the outer and inner sides of the bent body shown on FIG. 1, to allow bending in the direction illustrated, but prevent bending in the other direction beyond the straight. As can be seen the outer extensions and recesses are in contact and the inner extensions and recesses are separated in the straight section 6. In this way the design of the inner and outer profiles of the tubular elements sets the limits to which the body can bend in either direction in its bending plane.

The rope 4 is normally a metal rope comprising twisted strands or compacted wire, and a typical diameter is 10-20 mm. The tubular elements are a relatively close fit around the rope sufficient to allow axial movement and have a wall thickness of 7-15% of the rope diameter. Their radial thickness will though depend upon the material in which they are formed, and their length as shown L, from the peak of the extended section to the base of the recess, is around twice the rope diameter.

A typical body according to the invention has a standard 14 mm metal rope within steel tubular elements with a wall thickness of around 1.5 mm (9-10% of the rope diameter). The length L of each element is around twice the rope diameter; say 30 mm, with the overall length being around 40 mm. The full depth of each extension and recess is around 10 mm.

In order to accommodate bending of the body the extended section 10 and recesses 12 at the ends of the tubular elements do not match. For example, the recesses can be more shallow than extensions to allow bending in both senses from straight. However, in the illustrated embodiment one edge of each recess is cut away or omitted as indicated at 24 to allow bending from straight in only the sense shown. The cutaway is typically 2-3 mm, but may be selected depending upon what maximum curvature of the body is required.

At each end of the body in FIG. 1 the rope 4 is attached to a shell 14, shown in cross section, which receives the respective terminal tubular element 2. The body is shown at its limit of bending and as a consequence the shells 14 substantially enclose both terminal elements. It will be understood that one or both of the shells and tubular elements will determine the limit to which the body may bend.

The body shown in FIG. 1 illustrates its construction. It will be appreciated that it may be extended or shortened for use in a particular application. For example, in an extended form the shells 14 may be, or be attached to complementary locking units such that the body as a whole forms a lockable loop for use as a bicycle or motorcycle lock. In a shortened form, it could be used to simply lock one item to another with one or both shells being releasably attached to the respective items.

Figure 2:
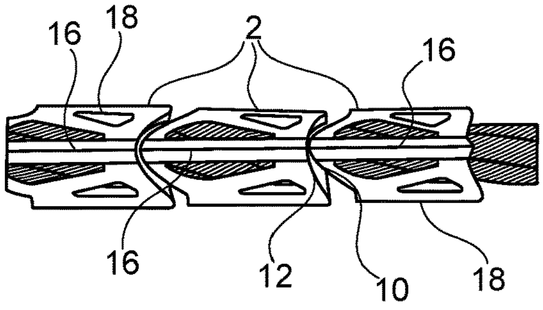
FIG. 2 shows tubular elements having a skeletal structure in a body of the invention.

FIG. 2 shows a train of tubular elements 2, each of which is a metal casting forming a skeletal structure. Extending between each extension 10 and recess 12 is a reinforcing strip 16 of cut resistant material such as cermet; tungsten carbide; titanium carbide; titanium nitride, and titanium carbon nitride. A similar strip is formed on the opposite side, and may also be formed on one or both of the outer and inner sides of the bent body as shown at 18. Of course, the entire element can be formed in a cut-resistant material, but for most applications strips such as are shown here are sufficient, and applied to elements cast in other materials such as metal alloys. The strips will be disposed such that they overlap on at least two sides to avoid gaps that might provide access for a conventional wire cutter whether the body is bent or straight.

Figure 3:
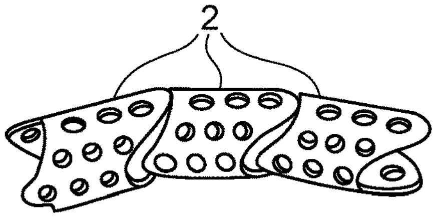
FIGS. 3 and 4 are perspective views of different forms of tubular elements.
Figure 4:
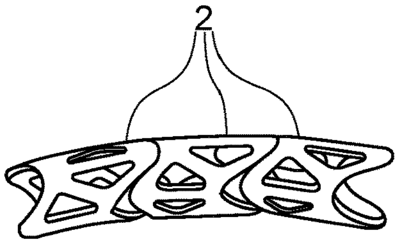

FIGS. 3 and 4 show different designs of tubular elements 2 formed from metal pressings. They have holes which reduce their weight, but these openings, like those in the skeletal structure of FIG. 2 are shaped and located not to facilitate access to the rope in an attempt to cut the body as a whole. A pressed element may be formed from a single pressing or matching pressings shaped and crimped, clinched or welded to form a tube. Cut-resistant material may be applied to these elements, but it is preferred to do so in the manner described below with reference to FIG. 5.

Figure 5:
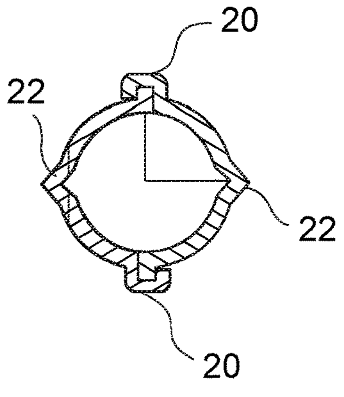
FIG. 5 shows a cross section through a tubular element formed from two components.

FIG. 5 shows the cross section of a tubular element formed from two identical pressings, crimped, clinched or welded together at the edges 20. The cross section shown also has ridges 22 creating internal channels for a cut-resistant material. It will be appreciated that the pressings may be shaped to form different channels, internal or external, for cut-resistant materials which can be applied by for example flame spraying or laser cladding.

Figure 6:
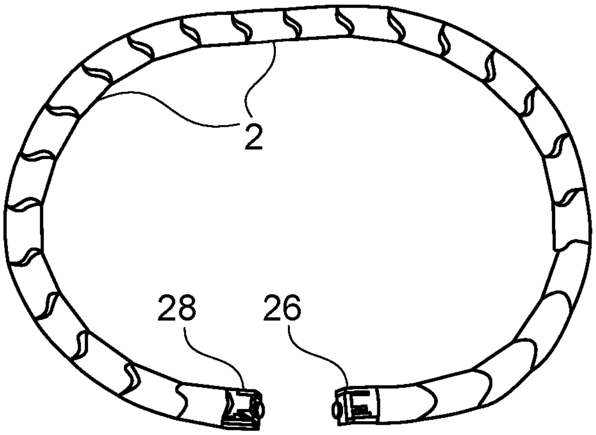
FIG. 6 shows an elongate body according to the invention extended to form a security device.
Figure 7:
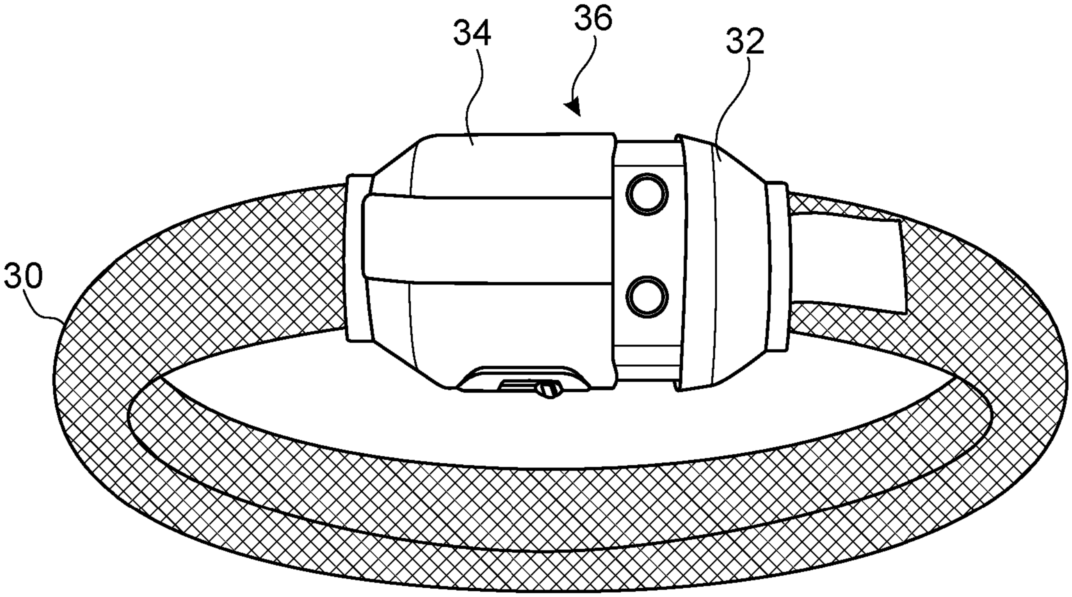
FIG. 7 shows a security device comprising an elongate body similar to that of FIG. 6.

The security device shown in FIG. 6 is a body similar to that of FIG. 1, but of extended length to enable it to complete a loop as in a bicycle or motorcycle lock. At each end of the body an adapted tubular element 26, 28 forms a shell which receives and retains the rope. The elements 26 and 28 may be coupled by a locking mechanism (not shown), directly or indirectly, to close the loop. The mechanism can comprise male and female lock units forming part of the elements 26, 28, or a separate unit into which the respective elements can be locked. The body will normally be contained within a polymeric cover (not shown), and may be enclosed in a fabric sleeve 30 as illustrated in the embodiment of FIG. 7. As can be seen in FIG. 7 the ends of the body (cover) and sleeve are received in units 32 and 34 of a lock 36. In each of the embodiments of FIGS. 6 and 7 the body in the shape illustrated is quite stiff, bending of the body having brought the tubular elements into close engagement to inhibit further flexure.

The invention claimed is:

1. An elongate body, comprising:

a rope extending within a succession of individual tubular elements closely spaced along the rope, each element having on two opposite sides of a single plane an extended section engaging a recess in its neighbouring element, the profiles of the section and recess allowing relative rotation of adjacent elements in said single plane, wherein there is no radial overlap between adjacent tubular elements, and wherein the elongate body is adapted to bend in said single plane.

2. The elongate body according to claim 1 wherein the rope is a wire rope.

3. The elongate body according to claim 2 wherein the rope is a compacted wire rope.

4. The elongate body according to claim 2 wherein the rope comprises metallic strands wound round a helically wound metallic core.

5. The elongate body according to claim 1 wherein the extended sections and recesses on said two opposite sides define the limits to which the body can be bent in both senses in said plane.

6. The elongate body according to claim 1 wherein the tubular elements have on a third side substantially perpendicular to said plane juxtaposed sections that restrict bending of the body to one direction in said plane.

7. The elongate body according to claim 1 wherein each tubular element comprises a cut-resistant material.

8. The elongate body according to claim 1 including a resin polymer filler around the rope within each tubular element.

9. The elongate body according to claim 1 wherein each tubular element is a skeletal structure.

10. The elongate body according to claim 1 wherein each tubular element is a perforated tube.

11. The elongate body according to claim 1 wherein each tubular element comprises a single metal pressing cut to shape and closed into a tube with the closing edges secured by one of crimping, clinching, and welding.

12. The elongate body according to claim 11 wherein the pressings are formed with ridges creating a channel for reinforcing strips.

13. The elongate body according to claim 1 wherein each tubular element comprises two matching metal pressings cut to shape and closed into a tube with the closing edges secured by one of crimping, clinching, and welding.

14. The elongate body according to claim 1 wherein each tubular element has on at least one side of said plane a reinforcing strip aligned with the engaging extended sections and recesses.

15. The elongate body according to claim 1 wherein each element comprises a cut-resistant material.

16. The elongate body according to claim 15 wherein the cut-resistant material is applied to each tubular element.

17. A security device comprising the elongate body according to claim 1.

18. The security device according to claim 17 wherein each end of the succession of tubular elements is received in a shell attached to an end of the rope.

19. The security device according to claim 18 wherein when the elongate body is at its limit of bending the shells enclose the ends of the succession of tubular elements.

20. The security device according to claim 17 including complementary locking units at respective ends of the body.

21. A flexible plate comprising a plurality of elongate bodies wherein each elongate body comprises a rope extending within a succession of individual tubular elements closely spaced along the rope; each element in the succession having on two opposite sides of a single plane an extended section engaging a recess in its neighbouring element, the profiles of the section and recess allowing relative rotation of adjacent elements in said single plane, wherein;

there is no radial overlap between adjacent tubular elements, the elongate body is adapted to bend in said single plane, and the bodies are laid side to side with tubular elements in each body linked to those in the neighbouring body.

22. A security device comprising an elongate body adapted to bend in a single plane, the elongate body comprising a rope extending within a succession of individual tubular elements closely spaced along the rope, each element having on two opposite sides of said single plane an extended section engaging a recess in its neighbouring element, the profiles of the section and recess allowing relative rotation of adjacent elements in said single plane but define the limits to which the elongate body can be bent in said single plane, the tubular elements having on a third side substantially perpendicular to said single plane juxtaposed sections that restrict bending of the body to one direction in said single plane, wherein a cut-resistant material is applied to each tubular element, and wherein there is no radial overlap between adjacent tubular elements.

23. The security device according to claim 22 wherein each tubular element has on at least one side of said plane a reinforcing strip of cut-resistant material aligned with the engaging extended sections and recesses.

* * * * *